(12) United States Patent
Levin et al.

(10) Patent No.: US 7,680,775 B2
(45) Date of Patent: Mar. 16, 2010

(54) METHODS AND SYSTEMS FOR GENERATING QUERY AND RESULT-BASED RELEVANCE INDEXES

(75) Inventors: Alan Levin, Vancouver (CA); Kaushal Kurapati, Yorktown Heights, NY (US); Tomasz Imielinski, Princeton, NJ (US); Apostolos Gerasoulis, Edison, NJ (US); Alexandrin Popescul, Mountain View, CA (US)

(73) Assignee: IAC Search & Media, Inc., Oakland, CA (US)

( * ) Notice: Subject to any disclaimer, the term of this patent is extended or adjusted under 35 U.S.C. 154(b) by 265 days.

(21) Appl. No.: 11/300,711

(22) Filed: Dec. 13, 2005

(65) Prior Publication Data

US 2007/0136234 A1 Jun. 14, 2007

(51) Int. Cl.
*G06F 17/30* (2006.01)
(52) U.S. Cl. .......................................................... 707/3
(58) Field of Classification Search ..................... 707/1, 707/2, 3, 10, 104.1; 705/76; 709/224
See application file for complete search history.

(56) References Cited

U.S. PATENT DOCUMENTS

| | | | | |
|---|---|---|---|---|
| 6,904,427 | B1 * | 6/2005 | Hagiwara et al. | 707/3 |
| 2003/0004897 | A1 * | 1/2003 | Smith, IV | 705/76 |
| 2004/0098370 | A1 * | 5/2004 | Garland et al. | 707/1 |
| 2005/0050215 | A1 | 3/2005 | Lin et al. | |
| 2005/0102259 | A1 | 5/2005 | Kapur | |
| 2005/0114235 | A1 | 5/2005 | Snyder et al. | |
| 2006/0122979 | A1 * | 6/2006 | Kapur et al. | 707/3 |

OTHER PUBLICATIONS

Pandey, S. and Olston, C., User-Centric Web Crawling, WWW 2005 May 10-14, 2005m Chiba, Japan <URL:hhtp//www.cs.cmu.edu/~olston/publications/userCentricCrawling.pdf>, entire document.
Wang, X., Wu, H., Wei, L.,Zhou, A., "Topic Exploration of Distillation for Web Search by a Generalized Similarity Analysis," Lecture Notes in Computer Science, vol. 2419, Proceedings of the Third International Conference on Advances in Web-Age Information Management, 2002—<URL:http://www.cs.ucr.edu/~wli/publications/SI.pdf>, entire document.
Tang, T.T., Craswell, N., Hawking, D. and Griffiths, K., "Focused Crawling for both Topical Relevance and Quality of Medical Information," CIKM?05, Oct. 31-Nov. 5, 2005—<URL:http://research.microsoft.com/users/nickcr/pubs/tang_cikm05.pdf>, entire document.

* cited by examiner

*Primary Examiner*—Etienne P LeRoux
(74) *Attorney, Agent, or Firm*—Stephen M. De Klerk; Sonnenschein, Nath & Rosenthal LLP

(57) ABSTRACT

Methods and systems for generating query and result-based relevance indexes are provided. For one embodiment, a plurality of queries is received from a plurality of users. Each query of the plurality of queries is measured based on one or more metrics. The measured data of each query is stored. The queries are associated into topical query categories. A performance of a first query category is calculated based on at least one metric of the one or more metrics. A metric data request for a select category is received from a client. Lastly, the stored measured data of the selected category is transmitted to the client in response to the metric data request.

17 Claims, 15 Drawing Sheets

METHODS AND SYSTEMS FOR GENERATING QUERY AND RESULT-BASED RELEVANCE INDEXES

BACKGROUND OF THE INVENTION

1). Field of the Invention

This invention relates, generally, to the field of organizing information, and more specifically to methods and systems for generating query and result-based relevance indexes.

2). Discussion of Related Art

The capability of organizing information has grown along with the ever-increasing availability of information. A vast source of available information may be found on internet-related networks (e.g. the World Wide Web (Web)) or other Internet sources. The Internet is an extensive network of computer networks through which information is exchanged by methods well known to those in the art (e.g. the use of TCP and IP protocols, etc). The Internet permits users to send and receive data between computers connected to this network. This data may include web sites, home pages, databases, text collections, audio, video or any other type of information made available over the Internet from a computer server connected to the Internet. This information may be referred to as articles or documents, and may include, a web page, data on a web page, attachments to a web page, or other data contained in a storage device (e.g., database).

Making sense of such a very large collection of documents, and foraging for information in such environments, is difficult without specialized aids. One such aid to assist in locating information is the use of search engines. Search engines are programs that allow the remote user to type in one or more search queries.

To locate articles on the Internet, a user of a remote computer inputs a query and a search process searches for the query terms. The search engine then compares the search query with the terms from the articles and retrieves the articles having terms that match the search query. The retrieved articles are presented to the requesting user as a result uniform resource locator ("URL").

However, query-tracking and measuring user interaction with result URLs associated with a query have been used for the limited purpose of providing feedback to the search engine, so that search results are more relevant to the user.

SUMMARY

The invention provides a method which includes (a) receiving a plurality of queries from a plurality of users; (b) measuring each query of the plurality of queries based on one or more metrics to determine measured data for each query; (c) storing the measured data of each query; (d) associating queries of the plurality of queries into topical query categories; (e) receiving a metric data request for a select category from a client; and (f) transmitting the stored measured data of the selected category to the client in response to the metric data request.

The metric may be a time metric.

The method may further include compiling the requested time metric data for the selected category into a 2-dimensional graph, an x-axis of the graph indicating the time metric and a y-axis of the graph indicating a number of queries.

The metric may be a geographic source of a query.

The method may further include compiling the requested geographic source metric data for the selected category into a 2-dimensional graph, an x-axis of the graph indicating the geographic source metric and a y-axis of the graph indicating a number of queries.

The metric may be a demographic variable of a user.

The method may further include compiling the requested demographic variable metric data for the selected category into a 2-dimensional graph, an x-axis of the graph indicating the demographic variable metric and a y-axis of the graph indicating a number of queries.

The method may further include calculating a performance of a first query of the plurality of queries based on the at least one metric, and comparing said calculation to the transmitted data.

The method may further include calculating an overall performance of the plurality of queries based on the at least one metric, and comparing said calculation to the transmitted data.

The invention also provides a method comprising (a) receiving a plurality of queries from a plurality of users; (b) associating queries of the plurality of queries into topical query categories; (c) providing a plurality of results for each query category to the users; (d) measuring user interaction with the results based on one or more metrics, to determine measured data for each result; (e) storing the measured data of each result; (f) receiving a metric data request for a select result of the plurality of results from a client; and (g) transmitting the stored measured data of the selected result to the client in response to the metric data request.

BRIEF DESCRIPTION OF THE DRAWINGS

The invention is further described by way of examples to the accompanying drawings, wherein.

DETAILED DESCRIPTION OF THE INVENTION

1. Overview

Embodiments of the invention provide methods and systems for generating query and result-based relevance indexes. Multiple queries are received from multiple users. Each query is measured based on one or more metrics. Various metrics may be used, such as time, geographic source of the query, and demographic variables of the user. The system then stores the measured data of each query. Queries of the plurality of queries are associated into topical query categories. A metric data request for a select category is received from a client. Lastly, the stored measured data of the selected category is transmitted to the client in response to the metric data request.

An intended advantage of this embodiment is to provide readily accessible business and research intelligence for outside entities. Business intelligence may include user sentiment, which may be used as unbiased, unsolicited, cost-effective poll information, which is based on larger poll groups than traditional polling methods. The intelligence may be used for building advertising schemes. Another intended advantage is to provide a tool for outside entities to make comparisons between queries, results, collective groupings of related queries or results, based on different measurements. Yet another intended advantage of this embodiment is to provide a client-customizable interface for extracting the desired query and result data collected by a search engine.

2. System

Figure 1:
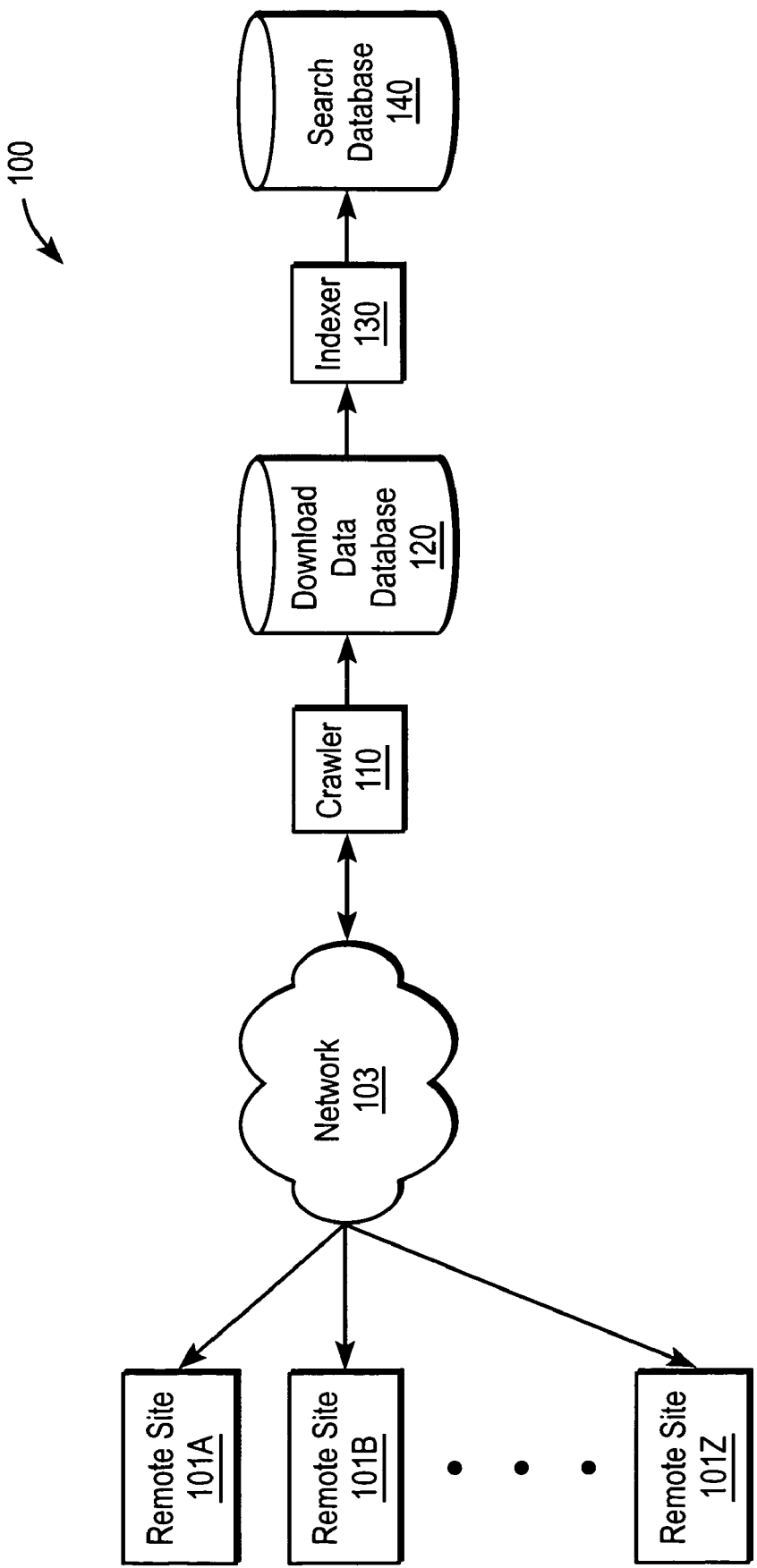
FIG. 1 is a block diagram illustrating components of a network system used to implement a search engine that operates in accordance with one embodiment of the present invention.
Figure 2:
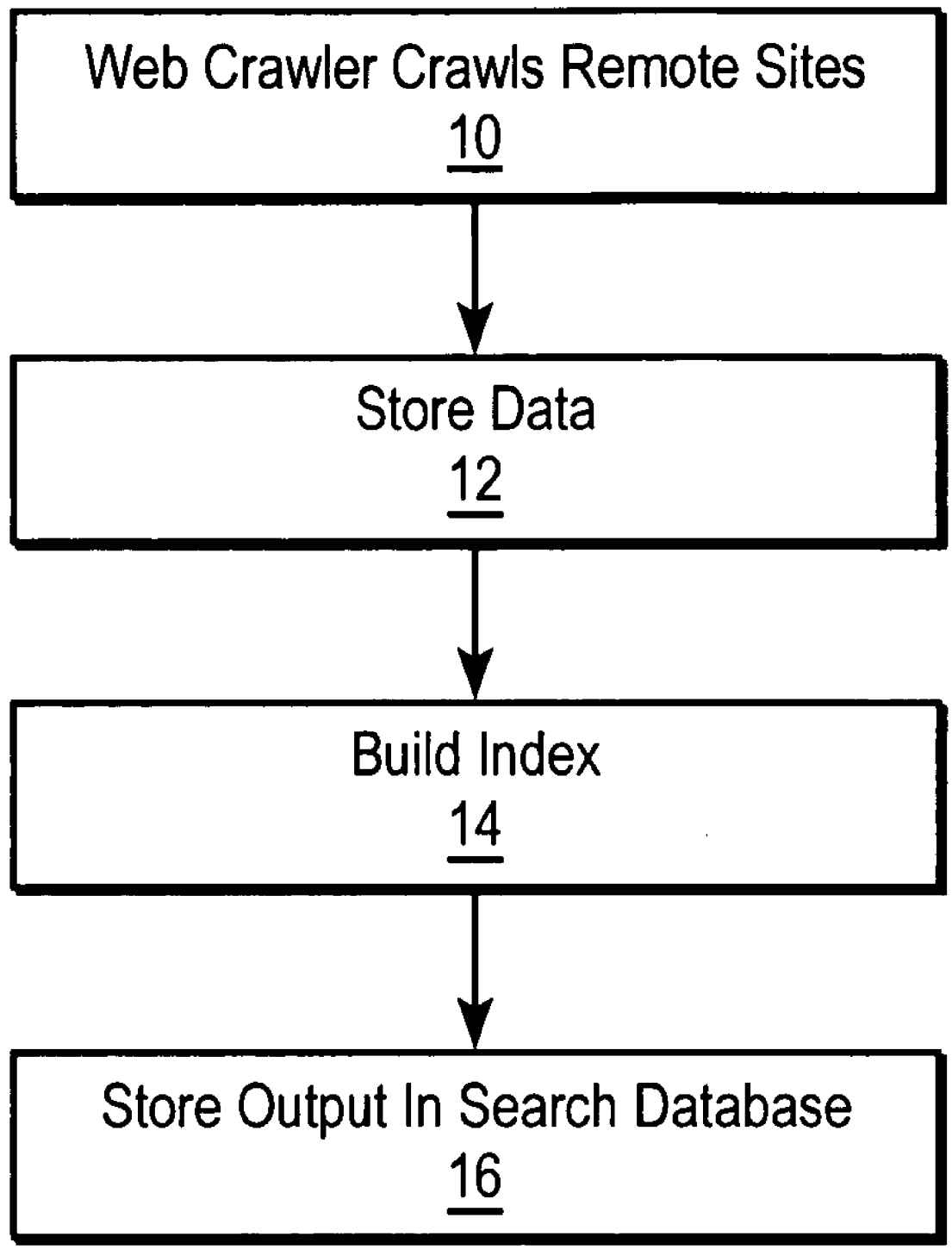
FIG. 2 is a flowchart illustrating the functioning of the components of FIG. 1.

FIG. 1 illustrates the components 100 of a network system used to implement a search engine that operates in accordance with one embodiment of the present invention and FIG. 2 illustrates the operation of the components 100. To facilitate searching in response to queries by users, a web crawler 110 crawls remote sites 101A-Z on the network 103 (10) while storing data of located web pages in a download data database 120 (12). The information in the download data database 120 is organized to be quickly accessible to users by the indexer 130. In general, the indexer 130 builds an index (14) based on a system of weighting. Various algorithms for indexing are well known in the art. The output from the indexer 130 is then hashed and stored in the search database 140 (16). The search database 140 of the system 100 stores a plurality of various types of stored content including documents, such as, web pages, content stored on web pages, including text, graphics, and audio and video content.

Information may be communicated through any type of communications network through which a plurality of different devices may communicate, such as, for example, but not limited to, the Internet, a wide area network (WAN) not shown, a local area network (LAN), an intranet, or the like. For example, as shown in FIG. 1, the web crawler 110 and remote sites 101A-Z are interconnected one to another through Internet 103, which is a network of networks having a method of communicating data, as described above, and is well known to those skilled in the art. The communication links coupling the network elements need not be a direct link, but may be indirect links including, but not limited to, broadcasted wireless signals, network communications, or the like.

Figure 3:
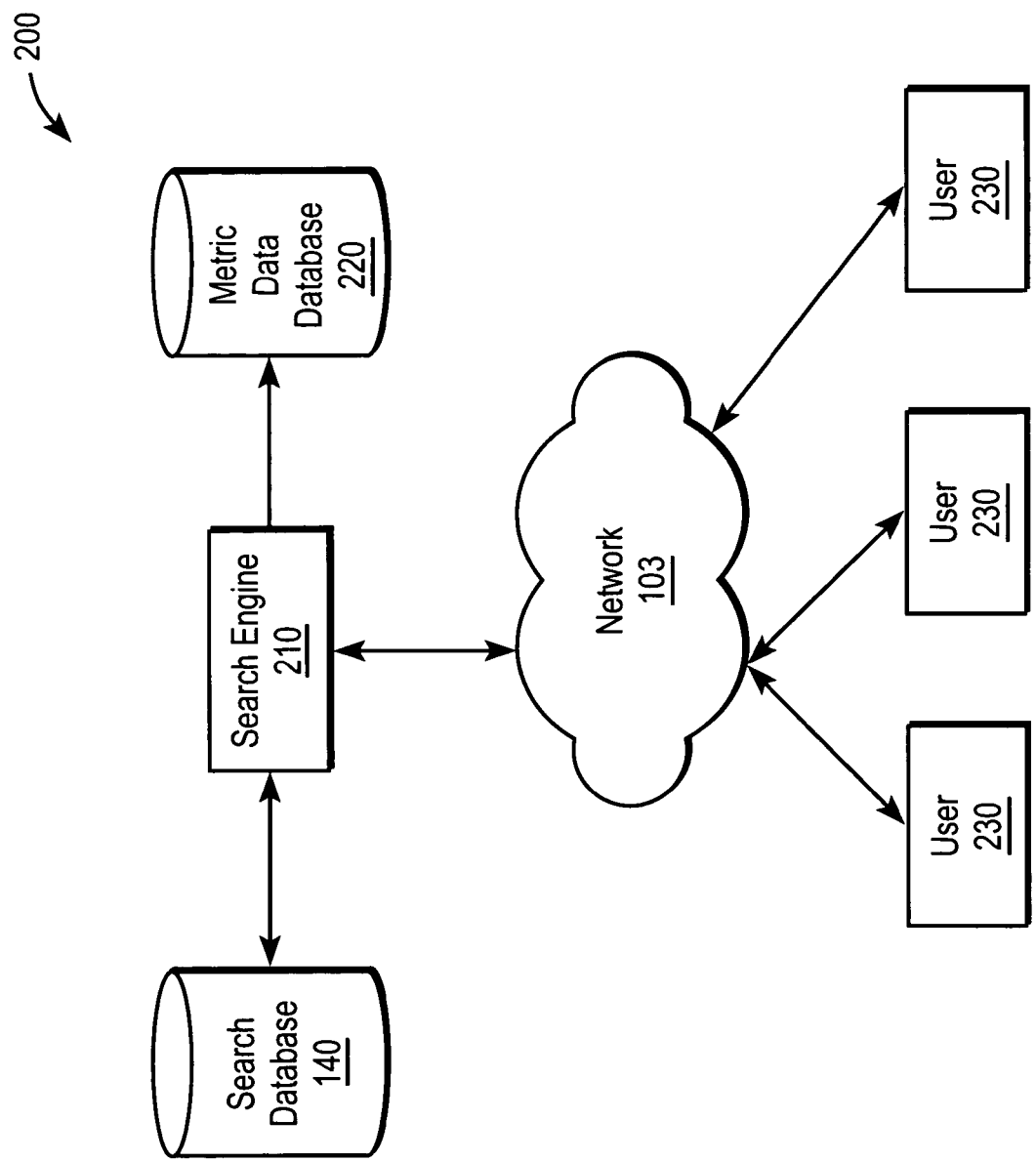
FIG. 3 is a block diagram illustrating components of the network system in which users access web site information via the Internet in accordance with one embodiment of the present invention.
Figure 4:
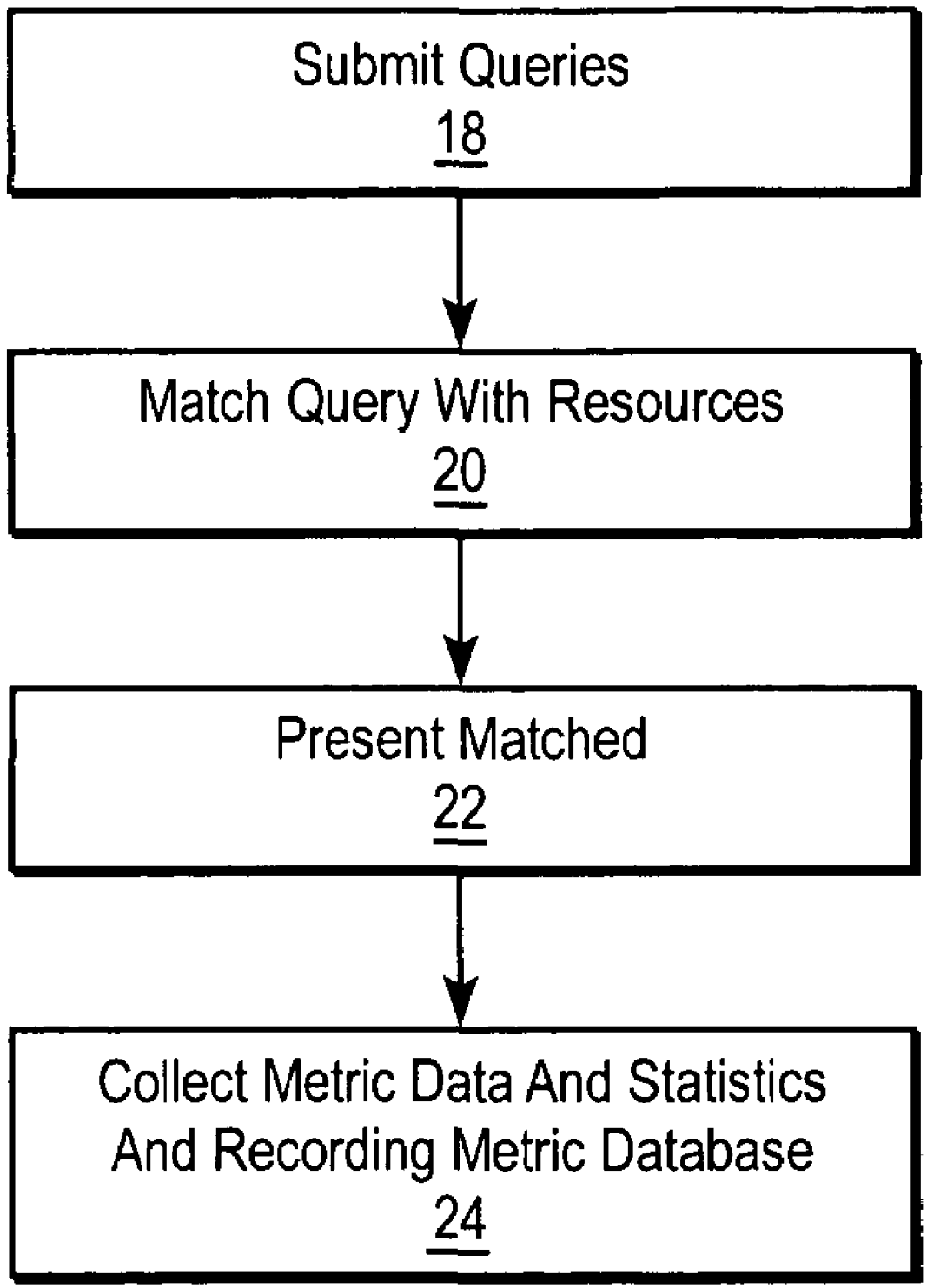
FIG. 4 is a flowchart illustrating the functioning of the components of FIG. 3.

FIG. 3 illustrates components 200 of the network system in which users access web site information via the Internet in accordance with one embodiment of the present invention and FIG. 4 illustrates the operation of the components 200. The components 200 include a search engine 210 that processes requests from users 230 received from user computers via the network 103, such as the internet. These requests include queries submitted (18) by users to search the Search Database 140. The search engine 210 looks for resources in the search database 140 that match the terms of the query (20). The matching resources may be sorted by relevance, and are presented to the user 230 (22) as results of the user's query. The search engine 210 also collects metric data and statistics (24) by recording the user transactions in a metric database 220. A user transaction may include, for example, a query submission and user interaction with results of a query. The logs of the user transactions include information about each query and results of a query, based on various metrics.

In one embodiment, a time metric is provided. Information related to the time of submission of a query or result is logged. Visual representation of result popularity for a category of queries over time is vital for improving search results by highlighting variations in uniform resource location (URL) picks, or user-selected results. Additionally, a mean, minimum, and maximum time spent by users on a result URL for a given category of queries may be logged.

In another embodiment, a geographic metric is provided. The geographical origin of the query is logged. Geography may relate to physical geography, for example a country, state, province, or jurisdiction indicating the origin of the query. Moreover, a region of geographic area, size of a geographic area, and climate of a geographic area may be logged as geographic metrics. Additionally, a user's IP address may serve as a geographic location. Various known methods of determining a likely origin may be used.

A showing of the geographic source of a query may indicate public sentiment of a topic in a particular jurisdiction. For example, if a group of queries ask about Coca-Cola and another group of queries ask about Pepsi, the user interest, based on geography, between these topics may be compared on a single graphical output. More users may for example ask about Pepsi in the northeastern region of the United States than Coca-Cola. The outside entities, Pepsi and Coca-Cola, may use this business intelligence in various ways, such as for targeted advertising campaigns.

In another example, a researcher may use the provided information to make generalizations about regional language semantics. A researcher may track the geological source for a query about the "Civil War" and another query about "The War Between the States." The graphical output may facilitate the discovery of regional semantics, where the west coast and northeast predominately use the moniker "Civil War" and the southern states predominately use the moniker "The War Between the States."

In another embodiment, demographic variables of a user may be logged. Exemplary demographic variables include age, gender, income, occupation, education, socioeconomic status, religion, nationality, race, family life cycle, family size, and sexual orientation. Any number and combination of demographic data may be used to define a demographic metric. Further, psychographic characteristics (adventuresome, techno-phobic, conservative, etc.) of users may also be logged. Various methods of determining a likely demographic variable or psychographic characteristics may be used.

Figure 5:
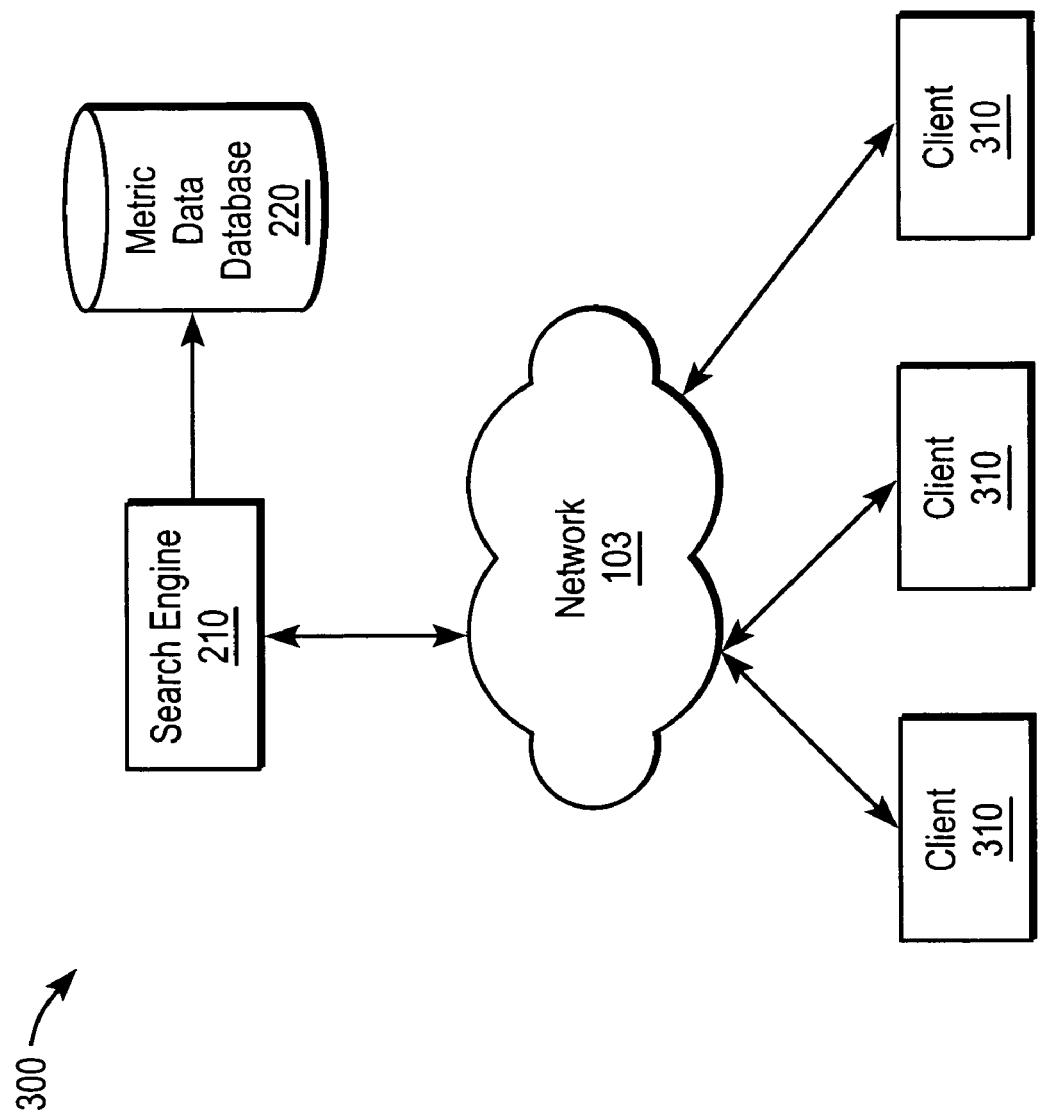
FIG. 5 is a block diagram illustrating components of the network system in which clients access metric data in accordance with one embodiment of the present invention.
Figure 6:
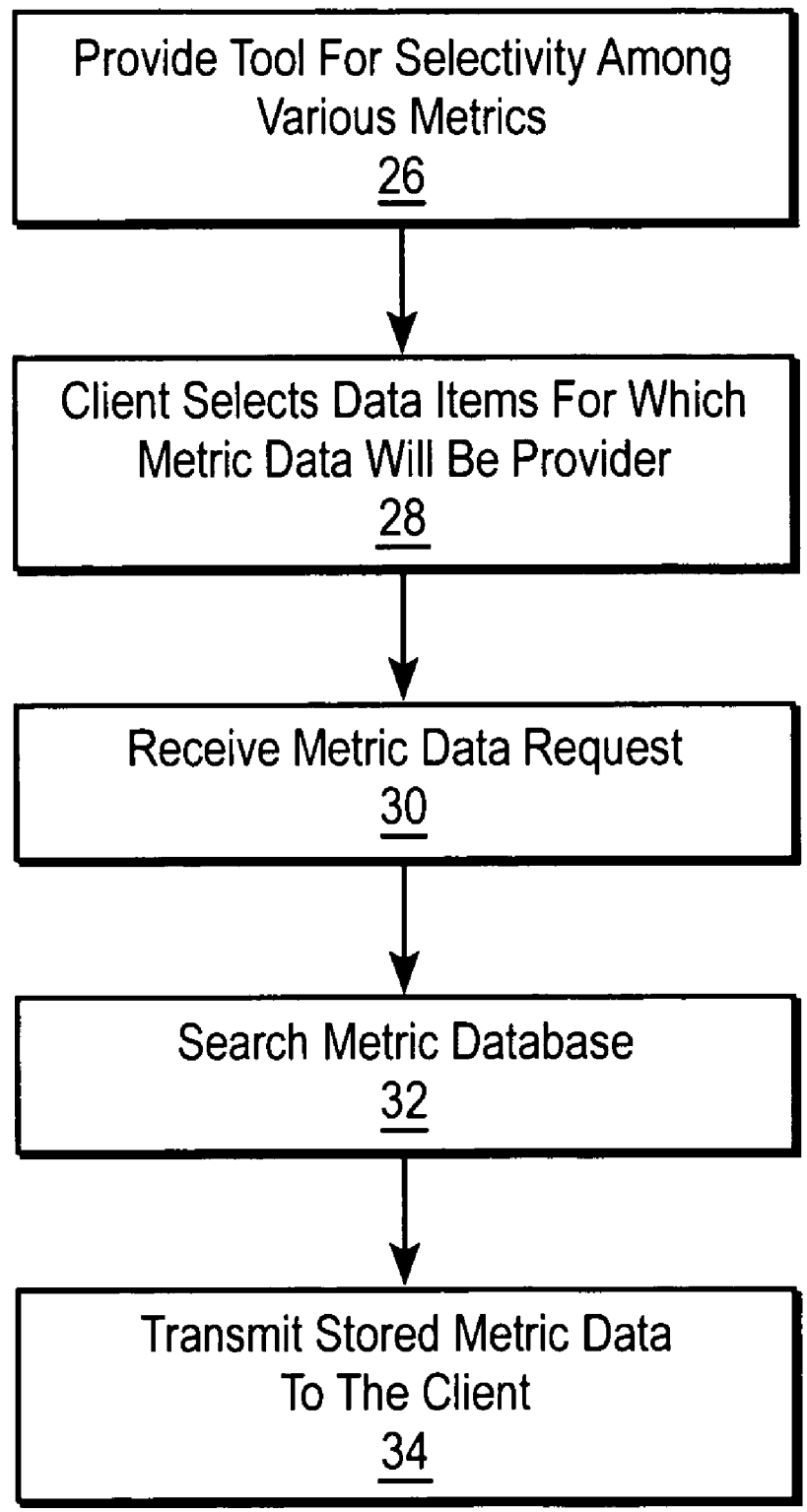
FIG. 6 is a flowchart illustrating the functioning of the components of FIG. 5.

FIG. 5 illustrates components 300 of the network system in which clients access metric data and FIG. 6 illustrates the operation of the components 400. A client 310 sends a request for metric data to the search engine 210 via the network 103. As discussed with reference to FIGS. 3 and 4, the search engine 210 receives a plurality of queries from a plurality of users and measures each query of the plurality of queries based on one or more metrics. The measured data of each query is stored in the metric database 220. The search engine 210 provides a client 310 with a tool to select among various metrics (26).

A client 310 may be given an option to select one or more data items for which metric data will be provided (28). A data item may include a specific category of queries (e.g. Pepsi, Pepsi Cola, etc.), or a particular result of a query.

The queries received by the users may be associated into topical query categories. A category of queries is an association of topically related or similar queries. Each category of queries may include multiple ones of the same exact query or multiple ones of different queries for the same topic. A category of queries per certain topical categories may be collected using various known clustering methods or may be done manually by sorting through the most popular queries per category. Categorizing may be implemented by the techniques described in U.S. patent application Ser. No. 10/853,552, entitled "METHODS AND SYSTEMS FOR CONCEPTUALLY ORGANIZING AND PRESENTING INFORMATION," filed on May 24, 2004, and U.S. patent application Ser. No. 11/200,779, entitled "A METHOD FOR TARGETING WORLD WIDE WEB CONTENT AND ADVERTISING TO A USER," which are incorporated herein by reference.

For example, queries for lyrics, band names, Britney Spears, etc. may be collected into a first category of "Music." Exemplary categories include, "Automotive," "Reference," etc. In another example, multiple sub-categories per category is used. A first sub-category for popular queries, and another sub-category for rare queries may be implemented.

Query categories can be observed over a period of time for the number of clicks they get from users. In one embodiment, a performance of a query category based on a metric may be calculated by averages or aggregates. The tool also provides the option to display the amount of time users spend on average on each of the queries, and also the time spent on the query basket per topic as a whole.

The client 310 may also select one or more metrics associated with each data item. As previously mentioned, metrics include time, geography, and demographic variables. Those skilled in the art may readily appreciate that other metrics may also be implemented. Other client-specific options may be provided, including, filtering, normalization, selecting a dependent variable on a 2-dimensional graph, selecting multiple data items for comparison, selecting multiple metrics of a data item for comparison, selecting list generation, and selecting time granularity.

The collection of metric statistics may be subject to filter constraints. In one embodiment, metric statistics for users with valid cookies are collected and users with invalid cookies are disregarded. In another embodiment, queries and results are filtered by user location or demographics; Metric statistics are collected if a user meets the filter criteria. Clients may have an option to create a customized filter scheme in which metric statistics for particular users are collected if the filter criteria are met. For example, clients may elect to filter out short time span clicks, clicks from SPAM IPs, and robot clicks.

The metric data may be normalized over the total query traffic per a time period at the client's election. For example, normalization is performed over the query traffic per day. For metric data based on queries, a number of users who asked a query is divided by a total number of users active on a particular day. For metric data based on query results, a number of users who clicked on a particular result URL is divided by a total number of users active on that day.

On a 2-dimensional graph, the metric data is a function of a dependent variable. In one embodiment, a client may select the dependent variable. For example, the metric data is plotted on an x-axis. A y-axis may represent the dependent variable, such as a number of queries. Alternatively, the y-axis may represent a number of unique users or IP addresses. In another embodiment, a second y-axis is rendered on the right side of the 2D graph, along with a first y-axis, allowing a direct comparison between the different y-axes. By permitting the direct comparison of a number of users and number of unique IP addresses, the system facilitates the detection of potential click-spam.

Moreover, the y-axis may represent a time spent on a query or a result URL. A client may select between an average time spent by a user on a query or result URL, or a cumulative time spent by users on a query or a result URL. Where an average time is selected, a minimum and maximum amount of time spent on the query or result URL may be included at the client's election.

Additionally, the y-axis may represent a result URL ranking or score for a particular query and result URL pair. For example, a client may request a time metric data for multiple result URLs associated with a particular query as well as a result URL score progression for each result URL as a function of time. For the particular query, the graph may thus include multiple result URL score-time series curves.

Clients may select multiple data items for comparison and multiple metrics of a data item for comparison. Multiple queries or results may be compared over a metric, such as time. For a single query or result, multiple metrics may be compared. For example, a time metric and a demographic variable may be compared for a single query or result.

Furthermore, a client may select list generation rather than (or in addition to) a graphic representation of the information. In one embodiment, a list of the top queries or results for a particular metric is displayed to the client. In another embodiment, for a particular query or result, a list of top metric measurements of a given metric are displayed to the client. For example, the top 10 geographic locations (by country, state, region, jurisdiction, etc.) for a given query or result are provided. For each geographic location, a percentage of contribution made to the overall users or result URL picks in a particular time period may be provided. This type of comparison information may indicate geographic domination relating to the query or result.

A user may select a time granularity as well as a range for plotting data using a time metric. A range of a time period may be selected, for example, beginning at $Time_x$ and ending at $Time_y$ on an x-axis of a 2-dimensional graph. Moreover, a user may select a unit for each increment of the metric; The client may specify the frequency with which data is plotted. In one embodiment, data is plotted in daily, weekly, or monthly intervals.

For the weekly interval, the client may select among sub-options. A first sub-option includes a display of the number of users on a particular day of the week within a time period specified by the client. A second sub-option includes a display of a past 7-day moving average of the number of users plotted at a weekly interval. A third sub-option includes a display of calendar weekly averages (Sunday through Saturday). Information plotted by weekly averages viewed in graphical form facilitates the recognition of similar behavior patterns.

For the 1-month interval, sub-options include a display of the number of users on a particular day of a month within a time period specified by the client and across multiple months. A second sub-option includes a display of a past 7-day moving average of the number of users plotted at month frequency. The past 7-day moving average is computed using the first day of the start-time period chosen by the client. A third sub-option includes a display of a monthly-moving average plotted on a monthly interval. For a query or result URL, an option to overlay the moving average curves with daily user numbers on the same graph may be presented. Sub-options for a daily time-window may also be provided.

Those skilled in the art will recognize that the foregoing examples of metrics and client customizable features are illustrative and not limiting. Any number and/or combination of metrics and customizable features may be used. Other forms of charts and graphs may be used to display the desired information or comparisons.

The search engine 210 receives the metric data request (30) for the selected data item from the client. In one embodiment, the search engine 210 begins processing the metric data request by searching the metric database 220 (32) for the data item and the associated metric data.

In another embodiment, the requested metric data is not logged in the metric database 220 until a client requests the metric data to be recorded. Accordingly, the search engine 210 processes the metric data request by prospectively recording the requested metric(s) for the data item.

Where the requested metric data is located in the metric database 220, the search engine 210 transmits the stored measured data (metric data) to the client 310 (34), in response to the metric data request. In an alternative embodiment, the search engine 210 compiles the stored measured data into a form suitable for graphical representation, and subsequently transmits the graphical representation to the client 310, in response to the metric data request.

The graphical representation of the requested metric data may take any number of forms, as will be described below in greater detail.

Figure 7:
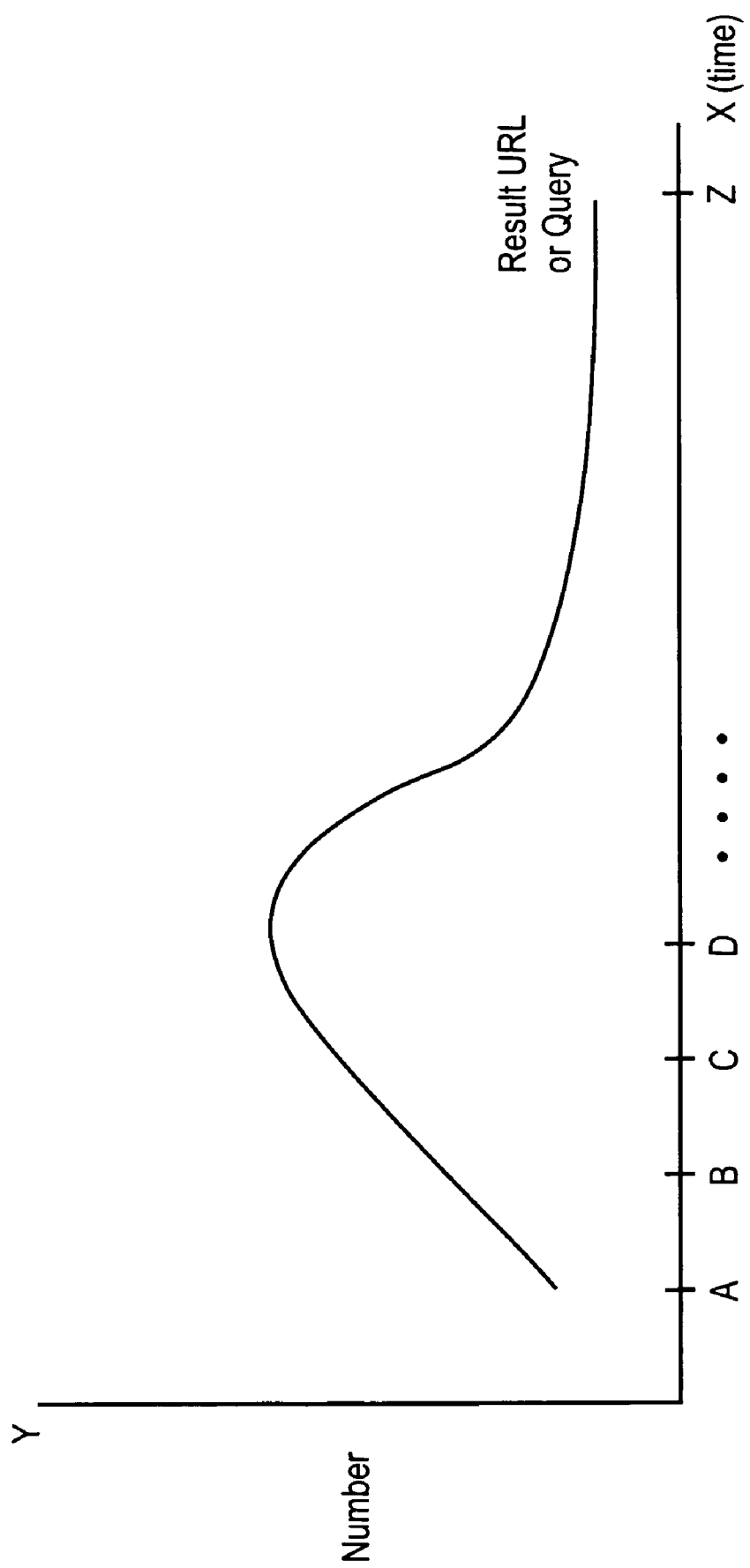
FIG. 7 is a graphical representation of a metric data corresponding to a query or a user-selected result.

FIG. 7 illustrates an exemplary graphical representation of a metric data corresponding to a query or a user-selected result. The x-axis depicts a single metric. The y-axis depicts a number of users. In one embodiment, the popularity (y-axis) of a query or result is shown as a function of a time metric (x-axis).

In another embodiment, the popularity if a query is described as a function of a geographic source metric. A number of use cases are described for illustration of this embodiment.

3. Query: "NASCAR"

Most stock car races are located in Southeastern region. However, in a case where a plot of the geographic profile for users asking about "NASCAR" indicates that the number of "NASCAR" queries originating from the Northwestern region was unexpectedly high, external entities, such as NASCAR, may use this business information on the public interest to by moving some races to tracks in the interested region.

4. Query: "Beyblade"

The Hasbro Beyblade toy was a popular item in Vancouver, Canada, leading to limited supplies of the product. Yet across the border to Washington, USA, demand for the toy was sharply lesser. External entities, such as Hasbro, may use a query-based relevance index to gain more insight into the hotspots of interest for the product, and perhaps have altered its shipping strategies to increase profit.

5. Query: Movie Name

Foreign and art house movies are often released in a limited number of major cities. Query volume may indicate regions where interest in a particular movie is unusually high, perhaps due to concentrations of an ethnic or language group in that location. The same could be said for other products only available in limited release, such as designer fashions and specialty foods.

6. Query: Musical Artist Name

A musical artist is planning a tour. A factor that might affect which cities are on the tour could be the level of interest in the artist as measured by queries. One artist might be popular in college towns, another in urbanized areas, another only on the West Coast.

7. Query: Advertised Product Name

An external entity, such as an advertising company is trying multiple ad campaigns in different cities. The relative increase in queries about the product in each city could be one measure of the effectiveness of each campaign.

8. Query: Destination Name

An external entity, such as a North American ski resort, markets itself internationally. In some countries in Europe and Asia, it learns that it receives more queries than its competitors, in others, less. It can alter its marketing strategy accordingly.

Figure 8:
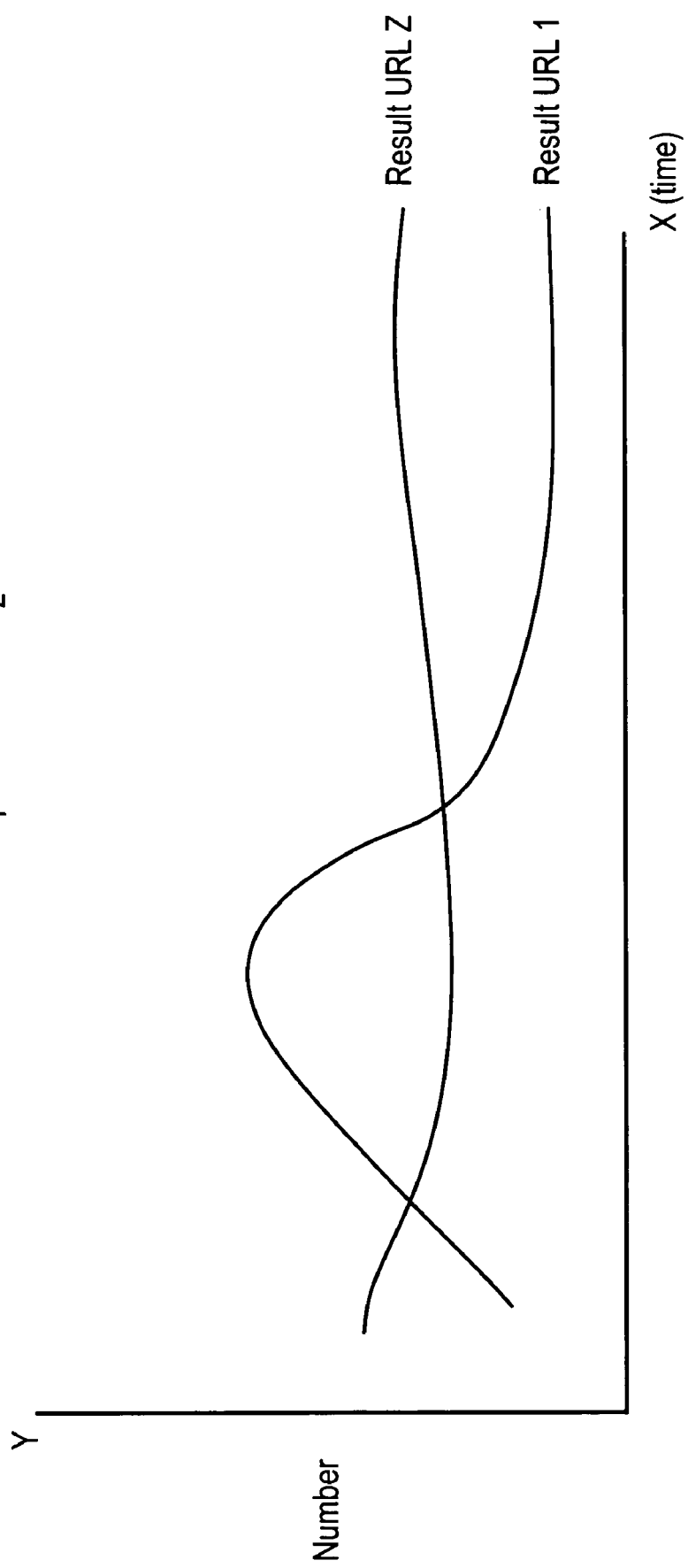
FIG. 8 is a graphical representation of the comparison of metric data corresponding to multiple queries or user-selected results.

FIG. 8 illustrates an exemplary graphical representation of the comparison of metric data corresponding to multiple queries or multiple user-selected results. For multiple query comparisons the Y-axis may be the number of users or IP addresses that had sessions containing the multiple queries or results under consideration. The popularity (y-axis) curve of a first result associated with a query is compared to the curve of a second result associated with the same query shown as a function of a time metric (x-axis).

Figure 9:
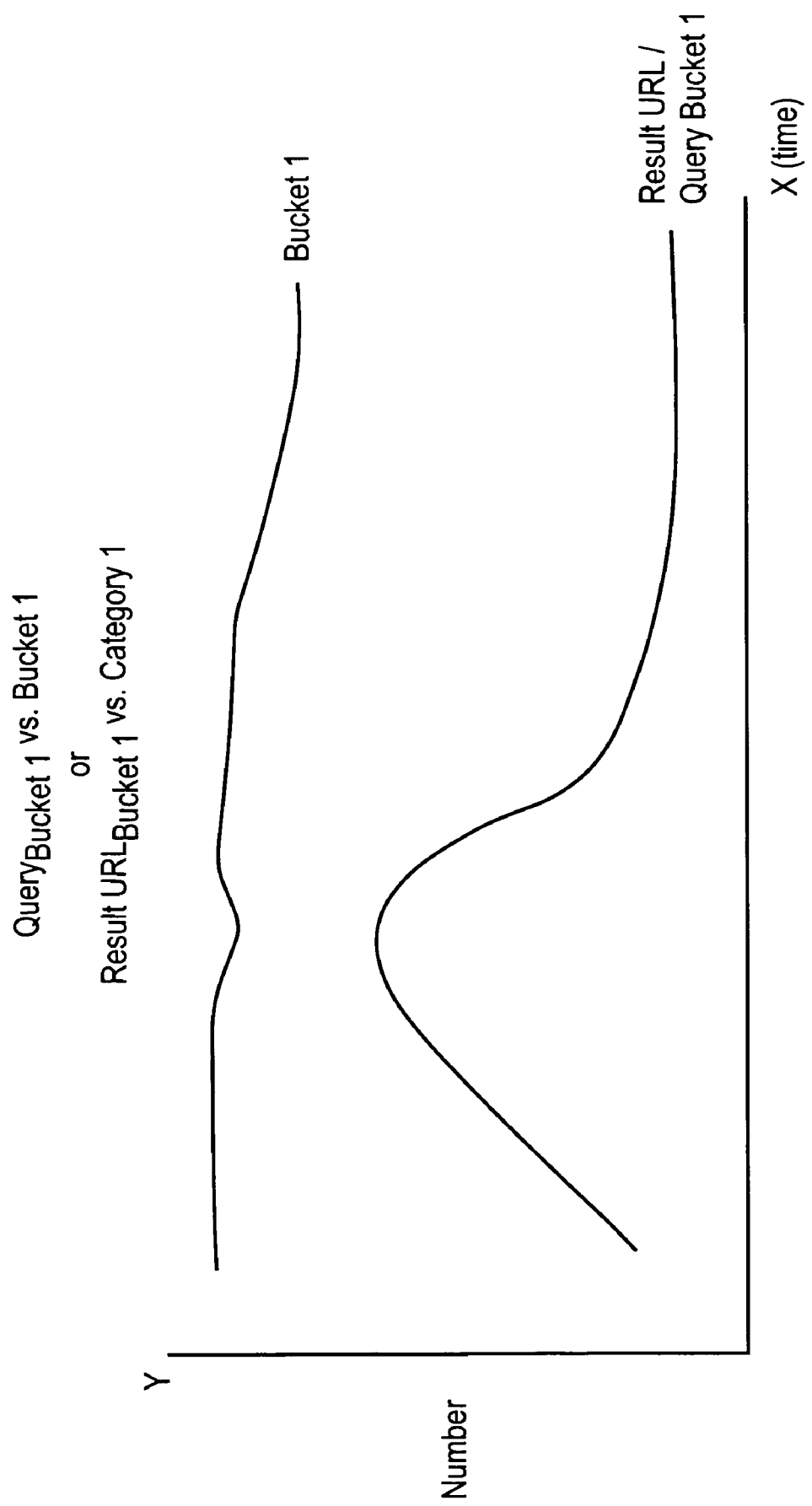
FIG. 9 is a graphical representation of the comparison of metric data corresponding to a query or a user-selected result and metric data of an associated set of queries or user-selected results.

FIG. 9 illustrates an exemplary graphical representation of the comparison of metric data corresponding to a query or a user-selected result and metric data of an associated set of queries or user-selected results. In one embodiment, a popularity (y-axis) curve of a result associated with a first query is shown as a function of time (x-axis). The first query is associated in a first category with other topically similar queries. The results of the queries comprising the first category are examined for popularity as a function of time. As shown, a popularity curve of the first category is shown as a function of time.

Figure 10:
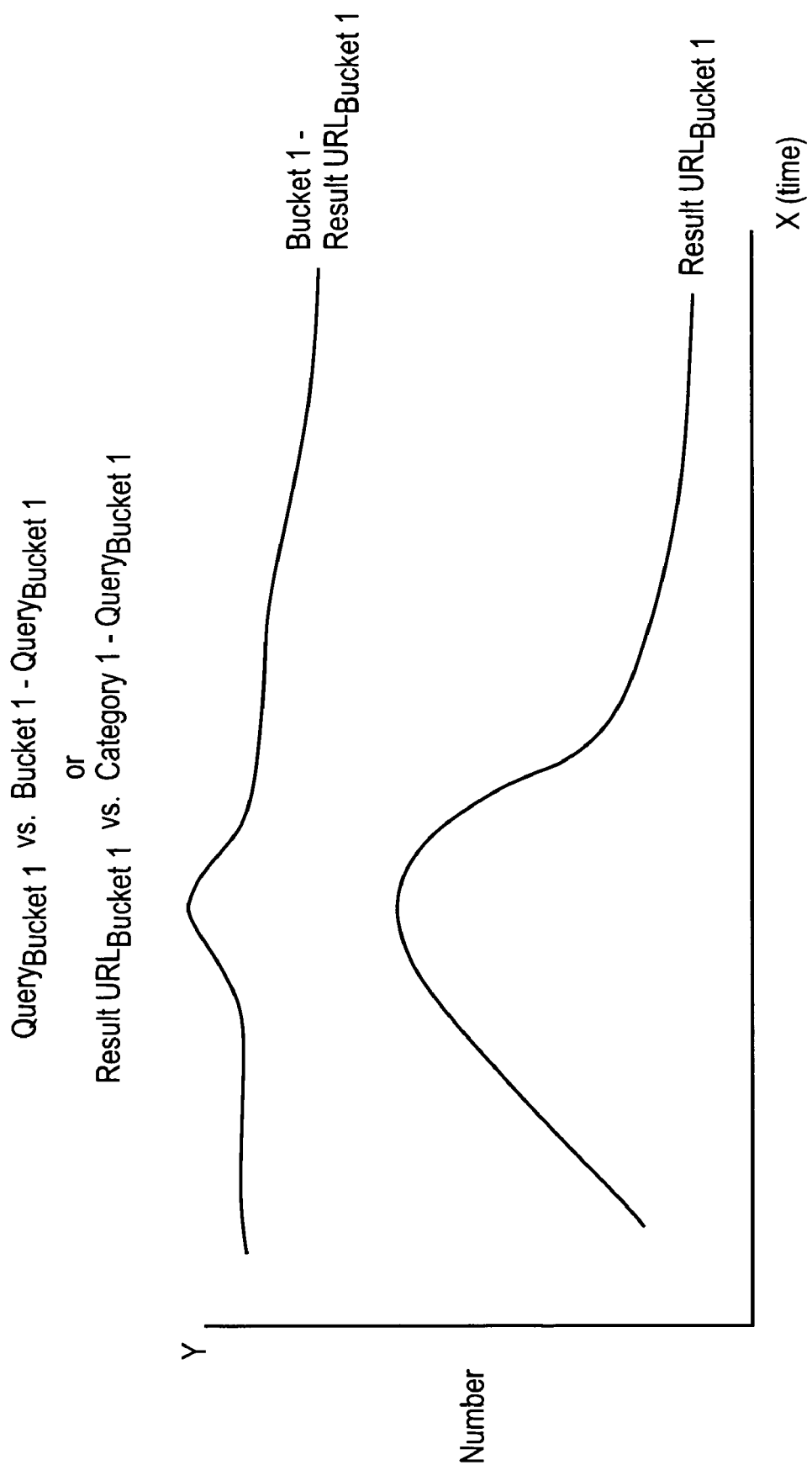
FIG. 10 is a graphical representation of the comparison of metric data corresponding to a query or a user-selected result and an associated group of queries or user-selected results.

FIG. 10 illustrates another exemplary graphical representation of the comparison of metric data corresponding to a query or a user-selected result and an associated set of queries or user-selected results. FIG. 7 is similar to FIG. 6, except that the popularity curve of the first category excludes the metric data of the result curve. This view facilitates the identification of any correlation between a particular query and the other queries in the same topical category.

Figure 11:
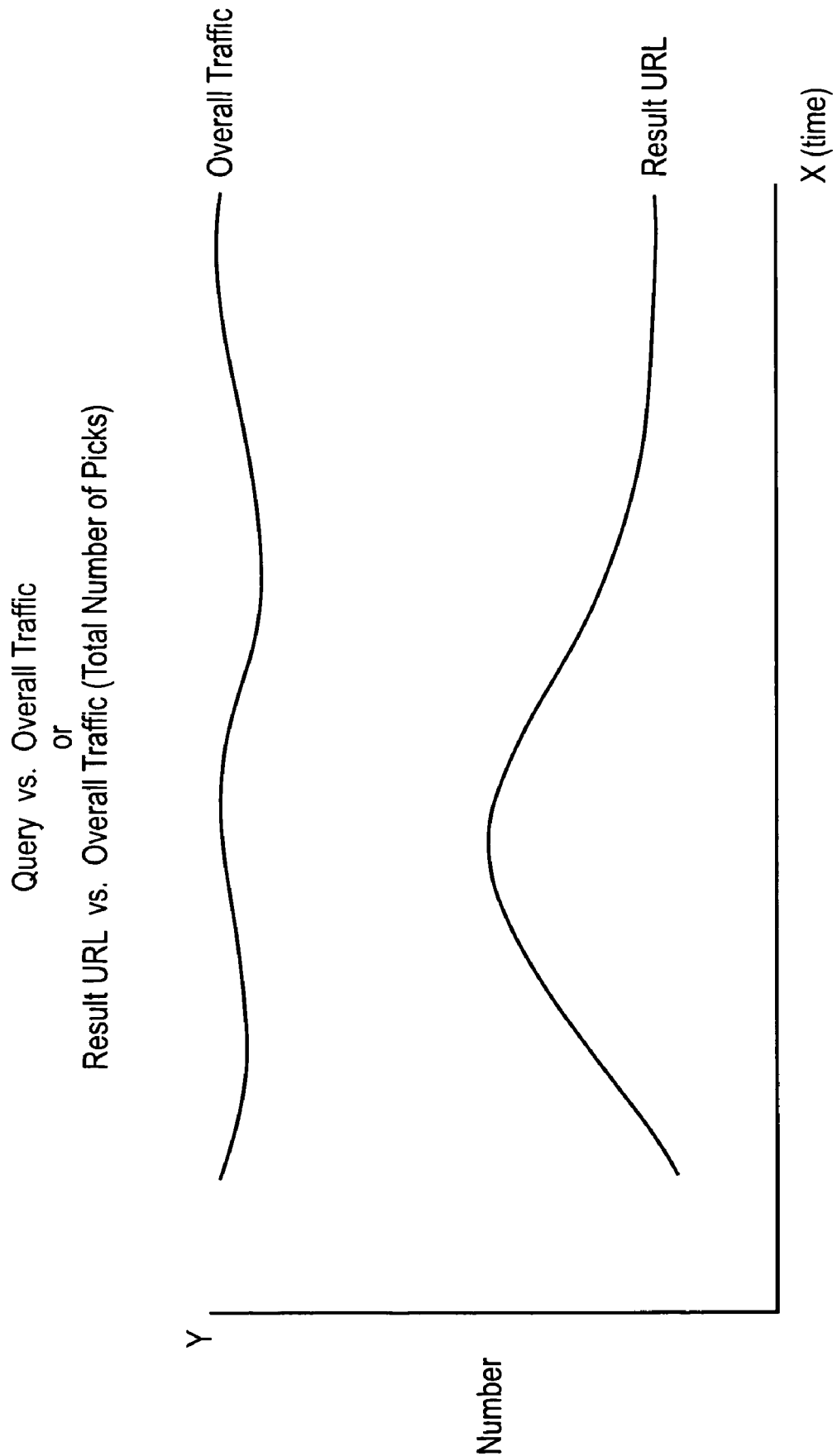
FIG. 11 is a graphical representation of the comparison of metric data corresponding to a query or a user-selected result and overall metric data.

FIG. 11 illustrates an exemplary graphical representation of the comparison of metric data corresponding to a query or a user-selected result and overall metric data. As shown, the result curve is a measure of the popularity of the result as a function of time. The overall curve is a measure of the popularity of overall traffic (user-selected results) for the particular time period.

Figure 12:
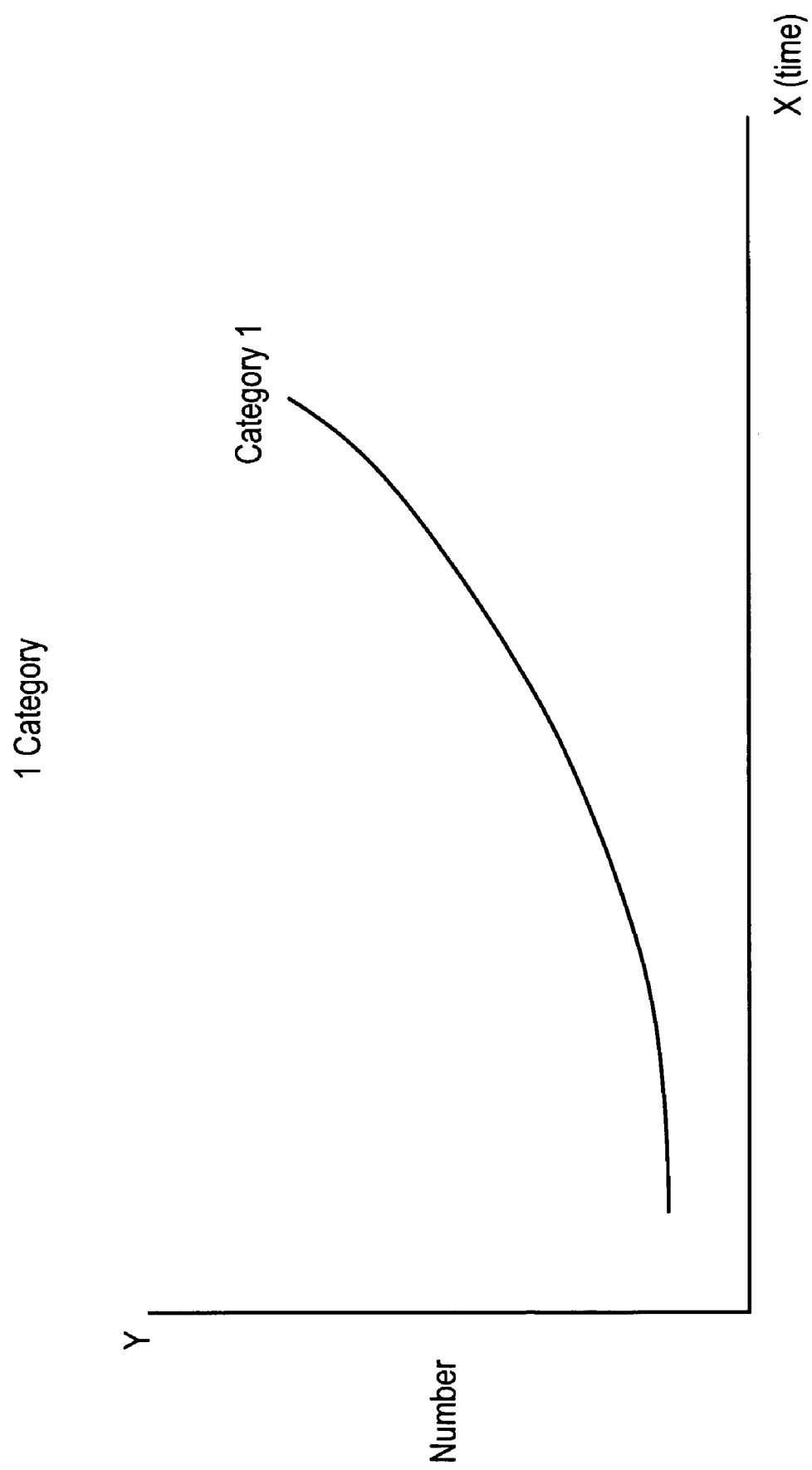
FIG. 12 is a graphical representation of a metric data corresponding to an associated set of queries or user-selected results.

FIG. 12 illustrates an exemplary graphical representation of a metric data corresponding to an associated set of queries or user-selected results. A set of queries is collected into a category. The graph shows a time metric in the x-axis, and a number of users on the y-axis. The category curve displays the fluctuations in the collective group of underlying queries. Alternatively, the category curve displays fluctuations in the user-selected results over a period of time for a given query category. A query category category may be indexed at an anchor point in time, thus creating a control against which other indexes may be compared.

Figure 13:
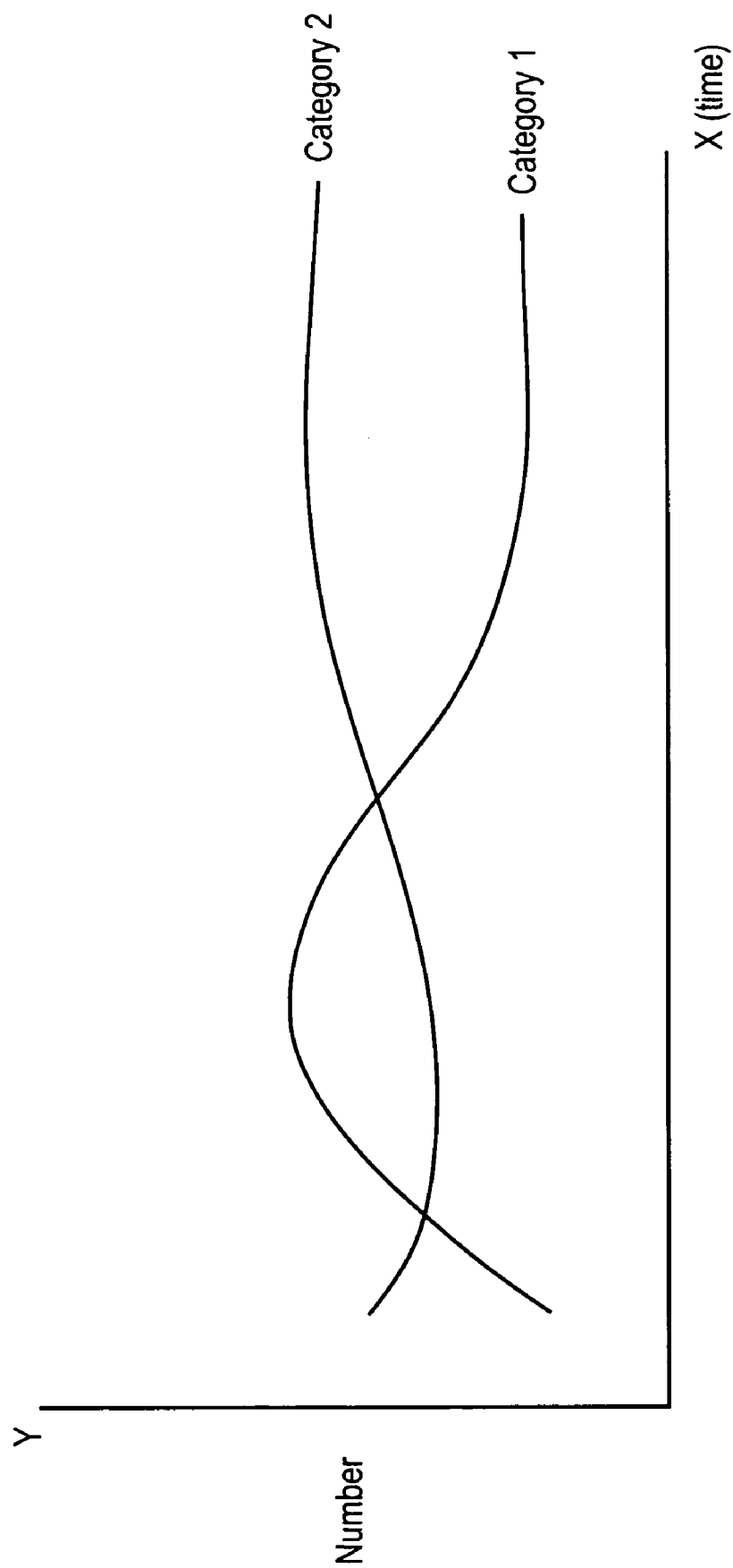
FIG. 13 is a graphical representation of the comparison of metric data corresponding to multiple associated sets of queries or user-selected results.

FIG. 13 illustrates an exemplary graphical representation of the comparison of metric data corresponding to multiple associated sets of queries or user-selected results. The popularity (y-axis) curve of a first category is compared to the curve of a second category, shown as a function of a time metric (x-axis).

Figure 14:
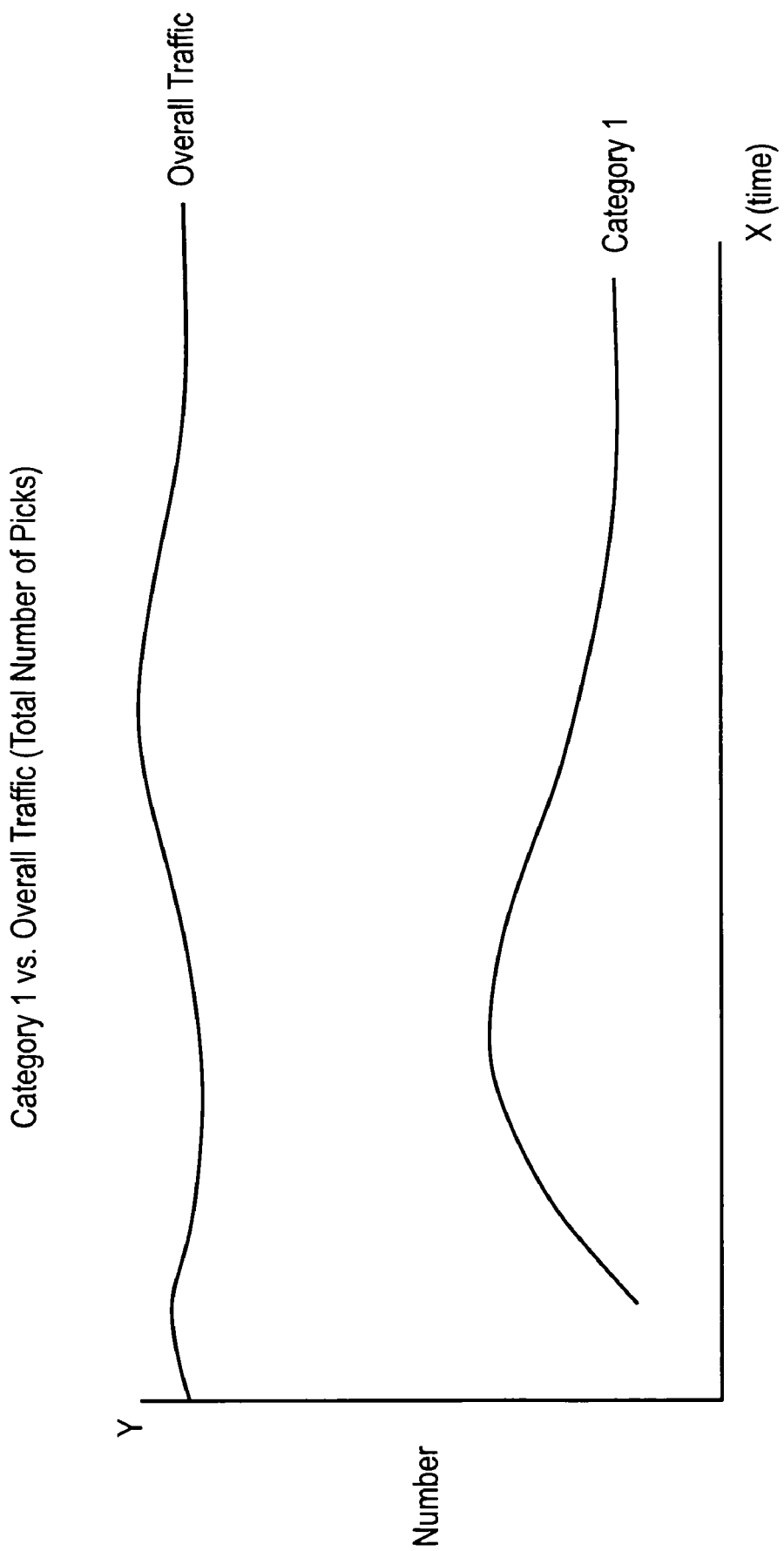
FIG. 14 is a graphical representation of the comparison of metric data corresponding to an associated set of queries or user-selected results and overall metric data.

FIG. 14 illustrates an exemplary graphical representation of the comparison of metric data corresponding to an associated set of queries or user-selected results and overall metric data. The category curve is a measure of the popularity of the category of associated queries or user-selected results as a function of time. The overall curve is a measure of the popularity of overall traffic of queries asked or user-selected results for a particular time period.

9. General Matters

Embodiments of the invention provide methods and systems for generating query and result-based relevance indexes. Though described above in terms of several exemplary embodiments, many additional applications exist for alternative embodiments of the invention.

The invention includes various operations. Many of the methods are described in their most basic form, but operations can be added to or deleted from any of the methods without departing from the basic scope of the invention. The operations of the invention may be performed by hardware components or may be embodied in machine-executable instructions as described above. Alternatively, the steps may be performed by a combination of hardware and software. The invention may be provided as a computer program product that may include a machine-readable medium having stored thereon instructions, which may be used to program a computer (or other electronic devices) to perform a process according to the invention as described above.

Figure 15:
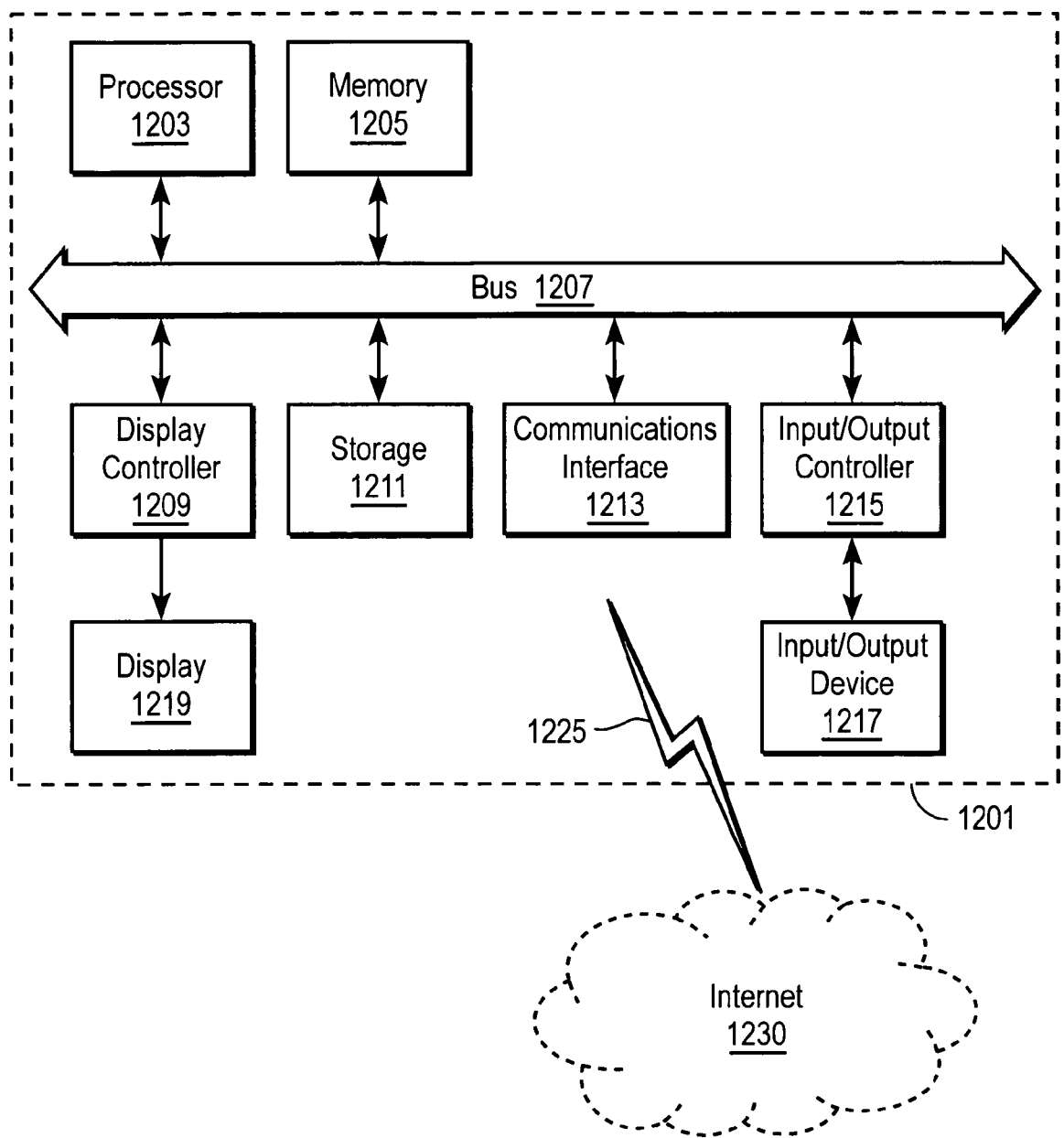
FIG. 15 is a block diagram that illustrates a digital processing system that can form part of the network system.

FIG. 15 is a block diagram that illustrates a digital processing system in accordance with one embodiment of the invention that may be used by the search engine 210, as discussed above in reference to FIGS. 1-3. For alternative embodiments of the present invention, processing system 1201 may be a computer or a set top box that includes a processor 1203 coupled to a bus 1207. In one embodiment, memory 1205, storage 1211, display controller 1209, communications interface 1213, and input/output controller 1215 are also coupled to bus 1207.

Processing system 1201 interfaces to external systems through communications interface 1213. Communications interface 1213 may include an analog modem, Integrated Services Digital Network (ISDN) modem, cable modem, Digital Subscriber Line (DSL) modem, a T-1 line interface, a T-3 line interface, an optical carrier interface (e.g. OC-3), token ring interface, satellite transmission interface, a wireless interface or other interfaces for coupling a device to other devices. Communications interface 1213 may also include a radio transceiver or wireless telephone signals, or the like.

For one embodiment of the present invention, communication signal 1225 is received/transmitted between communications interface 1213 and the Internet 1230. In one embodiment of the present invention, a communication signal 1225 may be used to interface processing system 1201 with another computer system, a network hub, router, or the like. In one embodiment of the present invention, communication signal 1225 is considered to be machine readable media, which may be transmitted through wires, cables, optical fibers or through the atmosphere, or the like.

In one embodiment of the present invention, processor 1203 may be a conventional microprocessor, such as, for example, but not limited to, an Intel Pentium family microprocessor, a Motorola family microprocessor, or the like. Memory 1205 may be a machine-readable medium such as dynamic random access memory (DRAM) and may include static random access memory (SRAM). Display controller 1209 controls, in a conventional manner, a display 1219, which in one embodiment of the invention, may be a cathode ray tube (CRT), a liquid crystal display (LCD), an active matrix display, a television monitor, or the like. The input/output device 1217, coupled to input/output controller 1215, may be a keyboard, disk drive, printer, scanner and other input and output devices, including a mouse, trackball, trackpad, or the like.

Storage 1211 may include machine-readable media such as, for example, but not limited to, a magnetic hard disk, a floppy disk, an optical disk, a smart card or another form of storage for data. In one embodiment of the present invention, storage 1211 may include removable media, read-only media, readable/writable media, or the like. Some of the data may be written by a direct memory access process, into memory 1205 during execution of software in computer system 1201. It is appreciated that software may reside in storage 1211, memory 1205, or may be transmitted or received via modem or communications interface 1213. For the purposes of the specification, the term "machine readable medium" shall be taken to include any medium that is capable of storing data, information or encoding a sequence of instructions for execution by processor 1203 to cause processor 1203 to perform the methodologies of the present invention. The term "machine readable medium" shall be taken to include, but is not limited to, solid-state memories, optical and magnetic disks, carrier wave signals, and the like.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A computer-implemented method comprising:
receiving, at a search engine, a plurality of signals, wherein each signal includes a query from a user;
measuring, at the search engine, each query using one or more metrics, to determine measured data for each query;
associating, at the search engine, the measured data with the metric used to measure it;
storing the measured data of each query and the metric associated with it on a medium;
associating, at the search engine, each query with at least one topical query category of a plurality of topical query categories using the stored measured data and the metric associated with it;
providing, at the search engine, a client with a tool to select a topical query category from the plurality of topical query categories;
receiving from the client, at the search engine, a selection of a topical category;

providing, at the search engine, the client with a tool to select data associated with a metric of the one or more metrics, wherein the metric is associated with the selected topical category;

receiving from the client, at the search engine, a request for data associated with a selected metric of the one or more metrics; and transmitting, by the search engine, the stored measured data associated with the selected metric to the client in response to the metric data request; and compiling the requested metric data for the selected category into a 2-dimensional graph.

2. The method of claim 1, wherein the metric is a time metric.

3. The method of claim 2, further comprising compiling the requested time metric data for the selected category into a 2-dimensional graph, an x-axis of the graph indicating the time metric and a y-axis of the graph indicating a number of queries.

4. The method of claim 1, wherein the metric is a geographic source of a query.

5. The method of claim 4, further comprising a compiling of the requested geographic source metric data for the selected category into a 2-dimensional graph, an x-axis of the graph indicating the geographic source metric and a y-axis of the graph indicating a number of queries.

6. The method of claim 1, wherein the metric is a demographic variable of a user.

7. The method of claim 6, further comprising compiling the requested demographic variable metric data for the selected category into a 2-dimensional graph, an x-axis of the graph indicating the demographic variable metric and a y-axis of the graph indicating a number of queries.

8. The method of claim 1, further comprising:
calculating a performance of a query based on the at least one metric; and
comparing said calculation to the transmitted stored measured data.

9. The method of claim 1, further comprising:
calculating an overall performance of a plurality of queries based on the at least one metric; and comparing said calculation to the transmitted stored measured data.

10. A computer-implemented method comprising:
receiving, at a search engine, a plurality of signals, wherein each signal includes a query from a user;
associating, at the search engine, each query with a topical query category;
providing to a user, at the search engine, a plurality of results for each query category to the user in response to a query;
measuring, at the search engine, user interaction with the plurality of results based on one or more metrics, to determine measured data for each result;
associating, at the search engine, the measured data with the metric used to measure it;
storing the measured data of each result and the metric associated with it on a medium;

providing, at the search engine, a client with a tool to select a result of the plurality of results;

receiving from the client, at the search engine, a selection of a result;

providing, at the search engine, the client with a tool to select metric data associated with the selected result;

receiving from the client, at the search engine, a request for metric data request associated with the selected result;

transmitting, by the search engine, the stored measured data of the selected result to the client in response to the metric data request; and compiling the requested metric data for the selected category into a 2-dimensional graph.

11. The method of claim 10, wherein the metric is a time metric.

12. The method of claim 11, further comprising compiling the requested time metric data for the selected category into a 2-dimensional graph, an x-axis of the graph indicating the time metric and a y-axis of the graph indicating a number of queries.

13. The method of claim 10, wherein the metric is a geographic source of a user-selected result.

14. The method of claim 10, wherein the metric is a demographic variable.

15. The method of claim 10, further comprising:
calculating a performance of query based on the at least one metric; and
comparing said calculation to the transmitted stored measured data.

16. The method of claim 10, further comprising:
calculating an overall performance of a plurality of queries based on the at least one metric; and
comparing said calculation to the transmitted stored measured data.

17. A computer system comprising:
at least one processor;
at least one medium connected to the processor; and
a data set on the medium, the data set being at least readable by the processor and including:
measured data of a query and metric data;
a search engine, wherein the search engine is enabled to receive a plurality of signals, each signal including a query from a user, provide a client with a tool to select a topical query category from a plurality of topical query categories, receive from the client a selection of a topical category, provide the client with a tool to select data associated with a metric, receive a metric data request from the client, and transmit the stored measured data associated with the selected metric to the client in response to the metric data request; and
a module to measure each query using one or more metrics to determine measured data for each query and associate each query into a topical query category using the stored measured data; and
compiling the requested metric data for the selected category into a 2-dimensional graph.

* * * * *